(12) United States Patent
Maine et al.

(10) Patent No.: US 6,939,496 B2
(45) Date of Patent: Sep. 6, 2005

(54) METHOD AND APPARATUS FOR FORMING COMPOSITE MATERIAL AND COMPOSITE MATERIAL THEREFROM

(75) Inventors: Francis William Maine, Ontario (CA); William Roy Newson, Ontario (CA)

(73) Assignee: PSA Composites, LLC, Renton, WA (US)

( * ) Notice: Subject to any disclaimer, the term of this patent is extended or adjusted under 35 U.S.C. 154(b) by 0 days.

(21) Appl. No.: 10/168,716

(22) PCT Filed: Dec. 19, 2000

(86) PCT No.: PCT/CA00/01555

§ 371 (c)(1),
(2), (4) Date: Oct. 28, 2002

(87) PCT Pub. No.: WO01/45915

PCT Pub. Date: Jun. 28, 2001

(65) Prior Publication Data

US 2003/0224147 A1 Dec. 4, 2003

Related U.S. Application Data

(60) Provisional application No. 60/172,586, filed on Dec. 20, 1999.

(51) Int. Cl.[7] ................................................ B29C 47/78
(52) U.S. Cl. ....................... 264/211.1; 524/9; 524/13; 264/288.8; 264/291
(58) Field of Search .................... 264/211.12, 211.2, 264/288.4, 288.8, 291; 524/9, 13

(56) References Cited

U.S. PATENT DOCUMENTS 4,228,116 A   10/1980   Colombo et al.
5,088,910 A * 2/1992   Goforth et al. ............. 425/142
5,169,587 A * 12/1992  Courval ...................... 264/323
5,516,472 A * 5/1996   Laver ......................... 264/118
5,951,927 A   9/1999   Cope

FOREIGN PATENT DOCUMENTS

| | | |
|---|---|---|
| DE | 198 54 475 A1 | 7/1999 |
| EP | 0 783 064 A1 | 7/1997 |
| EP | 0 988 947 A1 | 3/2000 |
| GB | 2060469 B | 9/1983 |
| JP | 07 109373 | 4/1995 |
| JP | 10071636 | 3/1998 |

OTHER PUBLICATIONS

International Preliminary Examination Report dated Aug. 2, 2002.
International Search Report Nov. 5, 2001.

* cited by examiner

*Primary Examiner*—Mary Lynn Theisen
(74) *Attorney, Agent, or Firm*—Pearne & Gordon LLP

(57) ABSTRACT

A system and method for extruding composite material and the composite material therefrom. The composite material consists of a filler mixed with a binding agent. The composite material is extruded as billets with enhanced physical properties, such as color, texture, electrical conductivity and fire retardancy, and contains a dispersion pattern of the filler material. A system and method are also provided for drawing the composite material through a die and a composite material produced thereby. The drawn composite material exhibits a density reduction over the density of the starting material and enhanced physical properties. A particularly useful tongue and groove arrangement are also provided for joining adjacent strips of a composite material made according to the extrusion process.

10 Claims, 5 Drawing Sheets

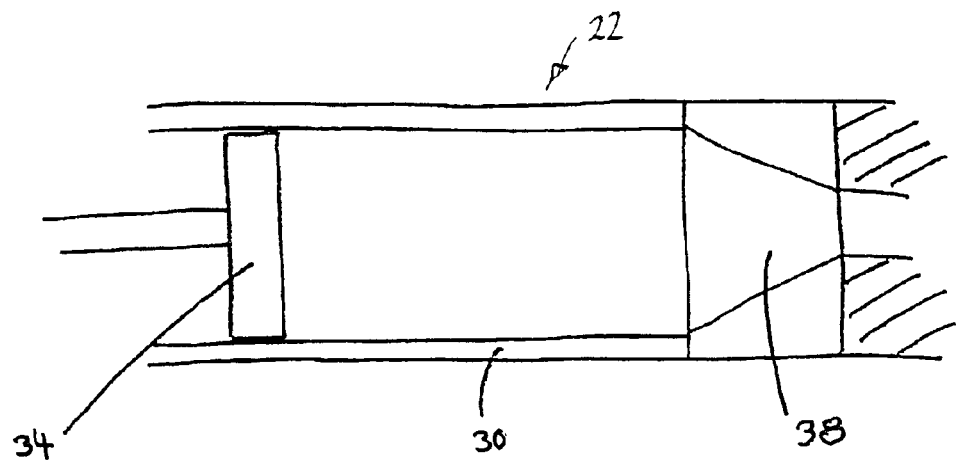
Fig 2
Figure 3
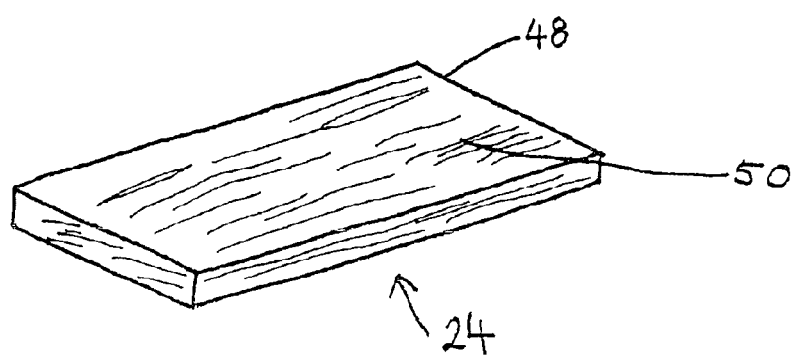

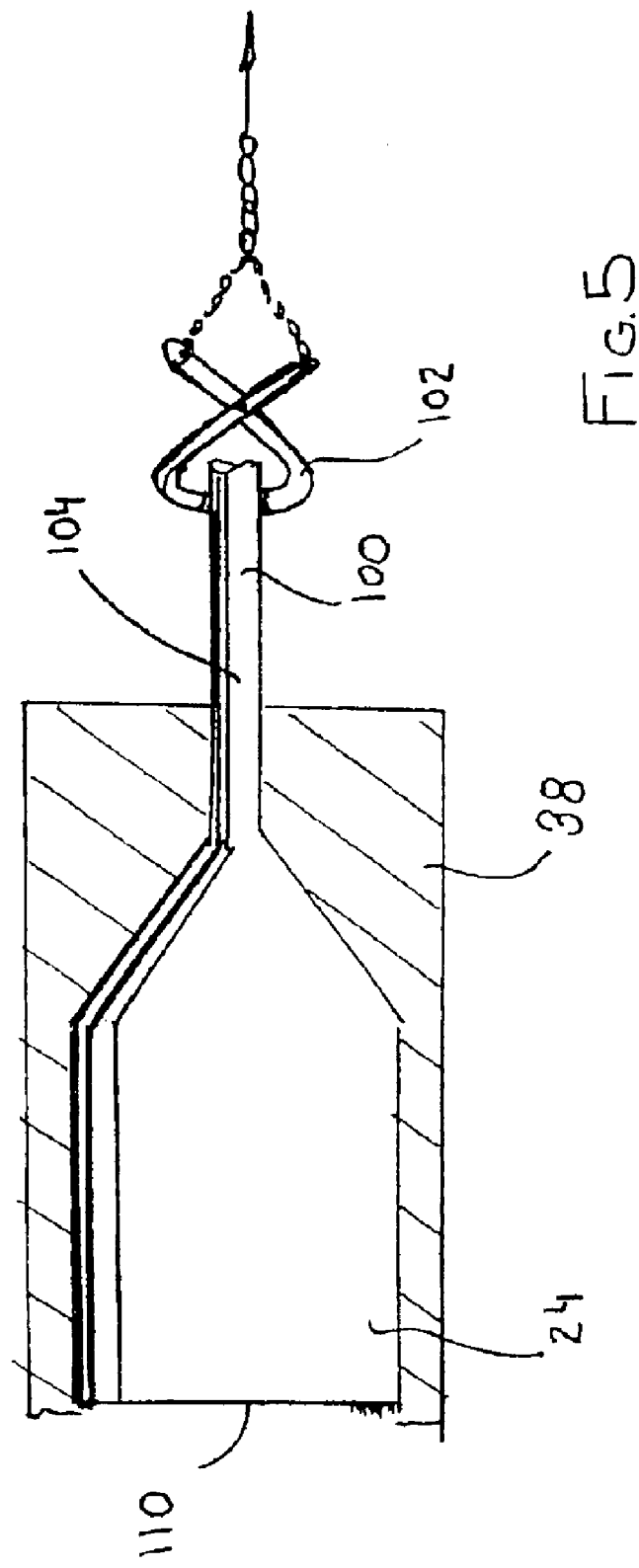

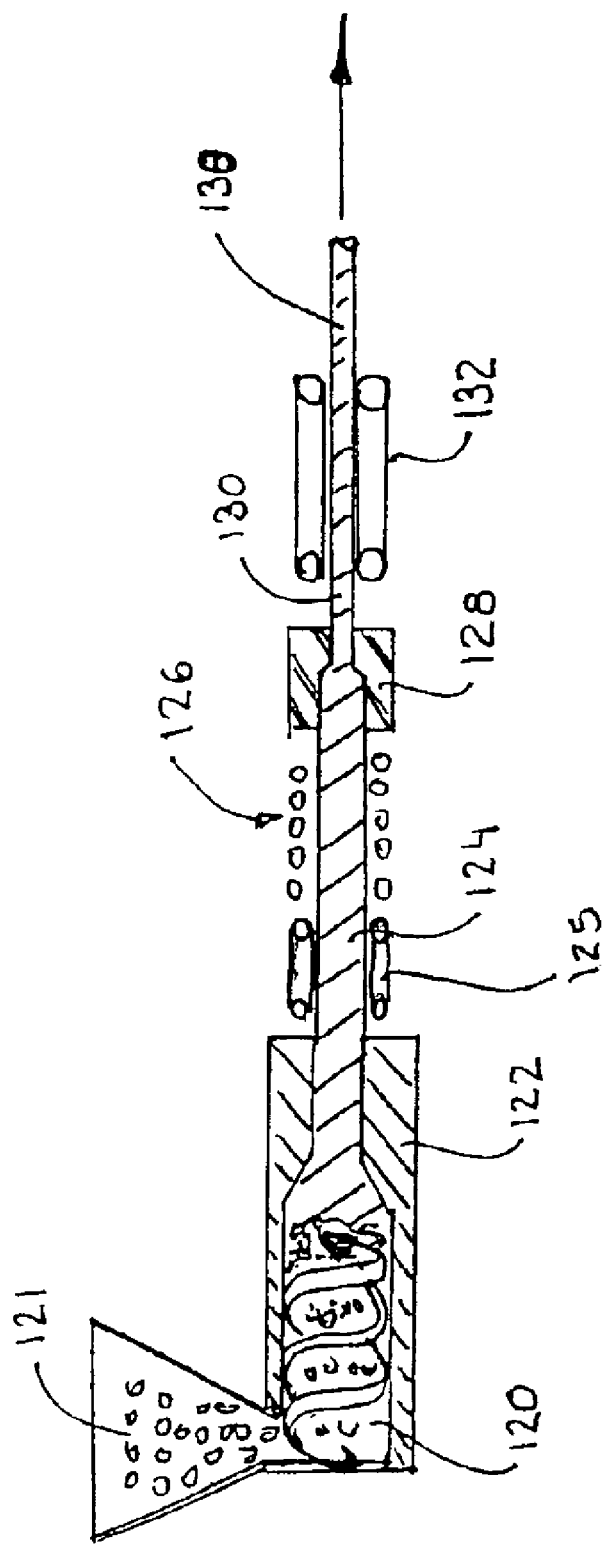

METHOD AND APPARATUS FOR FORMING COMPOSITE MATERIAL AND COMPOSITE MATERIAL THEREFROM

This application claims the benefit of provisional application Ser. No. 60/172,586, filed Dec. 20, 1999.

The present application claims priority from PCT/CA00/01555 filed Dec. 19, 2000.

FIELD OF THE INVENTION

The present invention relates to extrusion processes. In particular, the present invention relates to an extrusion method and apparatus for composite material.

BACKGROUND OF THE INVENTION

The process of solid-state extrusion is known. Extrusion processes that are used include ram extrusion and hydrostatic extrusion. Ram extrusion utilises a chamber in which polymer billets are placed, one end of which contains a die and the other an axially mobile ram. The billet is placed within the chamber such that the sides of the billet are touching the sides of the chamber. The mobile ram pushes the billets and forces them through the die.

In hydrostatic extrusion processes, the billet is of a smaller size than the chamber and does not come into contact with the sides of the chamber. The chamber contains a pressure generating device at one end and a die at the other. The space between the billet and the chamber is filled with a hydraulic fluid, pumped into the chamber at the end containing the pressure generating device. During operation pressure is increased on the hydraulic fluid and this in turn transmits pressure to the surface of the billet. As the billet passes through the die some of the hydraulic fluid adheres to the surface of the billet, providing additional lubrication to the process.

Both processes produce a polymer that is oriented in a longitudinal direction, having increased mechanical properties, such as tensile strength and stiffness. However, the orientation in a longitudinal direction can also make the polymer weak and subject to transverse cracking or fibrillation under abrasion. The process of pushing the polymer through a die can also create surface imperfections caused by frictional forces.

U.S. Pat. No. 5,204,045 to Courval et al. discloses a process for extruding polymer shapes with smooth, unbroken surfaces. The process includes heating the polymer shape to below the melting point of the polymer and then extruding the polymer through a die that is heated to a temperature at least as high as the temperature of the polymer. The process also involves melting a thin surface layer of the polymer to form a thin, smooth surface layer. The process produces a material of a uniform appearance and subsequent commercial applications are limited as a result.

SUMMARY OF THE INVENTION

A composite material comprising an oriented polymer and a particulate filler dispersed throughout the oriented polymer. The composite material has a reduced density which is less than the combined masses of the oriented polymer and a particulate filler divided by their combined respective volumes.

The oriented polymer maybe of plastic and the particulate filler may be selected from the group consisting of wood, slate, talc, vermiculite and mica.

The plastic may be polypropylene, polyethylene and polyvinyl chloride and present in an amount of from 95% to 60% by weight a compared to the particulate filler.

According to one embodiment, the oriented polymer is polypropylene and the particulate filler is wood sawdust having a particle size of about 60 mesh and present in amount of from 20% to 30% by weight as compared to the weight of the oriented polymer.

A process for producing an oriented composite material, said process comprising the steps of combining:
 (i) an extrudable polymer with a particulate filler to form a starting material;
 (ii) heating and extruding said starting material into a first column;
 (iii) adjusting the temperature of said first column to a drawing temperature;
 (iv) presenting said first column to a drawing die and causing said first column to exit said drawing die in a second column having a cross-sectional area less than that of said first column;
 (v) applying a pulling force to said second column to draw said first column through said drawing die at a rate sufficient to cause orientation of said polymer and to cause said second column diminish in density to form said composite material.

The extrudable polymer may be of plastic, such as polypropylene, polyethylene or polyvinyl chloride.

The particulate filler may be wood, slate, talc, vermiculite or mica.

The extruable polymer may be present in an amount of from 95% to 60% by weight in the starting material.

According to one embodiment, the extruable polymer is polypropylene, the particulate filler is wood sawdust having a particle size of about 60 mesh, the wood sawdust being present in an amount from about 20% to 30% by weight in the starting material.

The rate of drawing through the drawing die may be sufficient to cause the composite material to have a density of from 0.5 to 0.9 of the density of the starting material.

A composite material is provided which includes a filler for enhancing the physical properties of the composite material and a binding agent mixed with the filler for permitting extrusion of the composite material in a plastic extrusion process to provide a predetermined dispersing pattern of the filler in the composite material.

The filler may be natural or synthetic fiber and the binding agent may be a polymer.

A composite material is provided which comprises a particulate material dispensed in an oriented polymer.

The particulate material may be wood sawdust having a particle size of about 60 mesh. The oriented polymer may be polyethylene with the oriented polymer forming from 60% to 95% by weight of the composite material.

A strip of composite material is provided, suitable for strip flooring and having parallel upper and lower faces with first and second parallel edges extending between the upper and lower faces. The first edge has a tongue extending therefrom with parallel upper and lower curved surfaces. The second edge has a groove extending thereinto with curved parallel opposite sides. The tongue and the groove are of complimentary curvature for the tongue of a first strip to be rotatable into registration with the groove of an adjacent strip to resist lateral separation between the first strip, and the adjacent strips by interference between the upper and lower curved surfaces and the curved parallel opposite sides.

BRIEF DESCRIPTION OF THE DRAWINGS

Preferred embodiments of the present invention will now be described, by way of example only, with reference to the attached Figures, wherein:

FIG. 2 illustrates an extruder for extruding same;

FIG. 3 illustrates an extruded billet of the composite material;

FIG. 5 is a cross-sectional illustration of an alternate forming method according to the present invention; and FIG. 6 is a schematic illustration of an automated process of the method of FIG. 5.

DETAILED DESCRIPTION OF THE INVENTION

Figure 1:
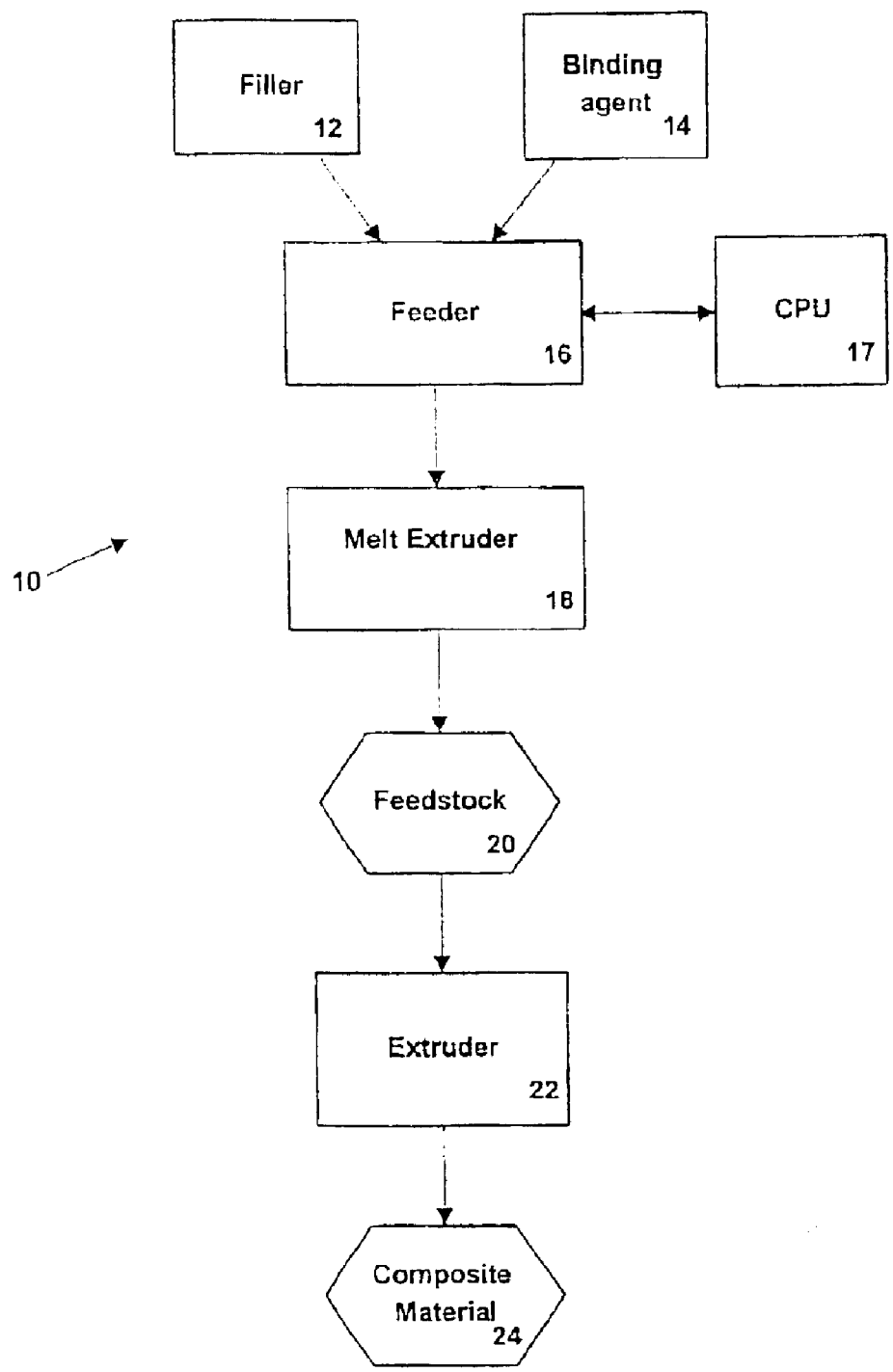
FIG. 1 illustrates a method of extruding a composite material according to the present invention.

Referring now to FIG. 1 a method of extruding a composite material is shown generally at 10. A filler 12 and a binding agent 14 are placed in a feeder 16. Feeder 16 feeds a predetermined volume of filler 12 and binding agent 14 into melt extruder 18. In an embodiment, feeder 16 is a gravimetric feeder controlled by an external CPU 17. Melt extruder 18 mixes filler 12 and binding agent 14 to form feedstock 20, as is well known to those of skill in the art. Feedstock 20 then passes to an extruder 22, and is extruded to produce a composite material 24.

Filler 12 can be a natural fibre, such as wood and agricultural fibres such as hemp, flax, straw or wheat; a synthetic fibre such as nylon, polyethylene terephthalate, glass or polypropylene fibre with a polyethylene matrix. Filler 12 can also be a mineral based filler such as slate, talc, vermiculite or mica. In a presently preferred embodiment, filler 12 is a wood fibre concentrate. Filler 12 has a mesh in the range of 10–300, more preferably in the range 10–150. In the presently preferred embodiment filler 12 has a 60 mesh.

Binding agent 14 is a polymer or other suitable extrudable plastic, such as polypropylene (PP), polyethylene (PE) or polyvinyl chloride (PVC). Binding agent 14 forms approximately 55–95% by weight of feedstock 20. Other ranges for the % weight of binding agent 14 in feedstock 20 may be appropriate depending on the filler chosen. More limited ranges of 60–95% or 70–90% may be required depending on the chosen filler 12.

Once filler 12 and binding agent 14 have been fed to feeder 16, they pass to melt extruder 18. A predetermined volume of filler 12, in accordance with the % weight of binding agent 14 that is used, and binding agent 14 are mixed in melt extruder 18 and extruded in a conventional manner to produce feedstock 20. The resultant feedstock 20 is fed by melt extruder 18 to extruder 22.

FIG. 2 illustrates a preferred embodiment of extruder 22. Extruder 22 has a ram 34, a pressure chamber 30 and a die 38. The method and apparatus of the extrusion process are detailed in U.S. Pat. No. 5,169,589 to Francoeur et al., U.S. Pat. No. 5,204,045 to Courval et al. and U.S. Pat. No. 5,169,587 to Courval, the contents of which are incorporated herein by reference. The method of the extrusion process produces a highly oriented polymer profile. The resultant composite material 24, produced by this process, generally has a higher tensile strength and modulus than feedstock 20. In the presently preferred embodiment an oriented product 48 of composite material 24, formed with a wood-fibre concentrate filler is produced in standard widths of 2 inches, 3 inches or 6 inches (5.08 cm, 7.62 cm or 15.24 cm).

FIG. 3 illustrates an oriented product 48 of composite material 24. Produced in the manner outlined above, composite material 24 has striations 50 of filler 12, formed in a dispersion pattern with a wood-grain appearance. The resultant oriented product 48 resembles hard wood flooring and can be adapted to be used in commercial applications as such. Appropriate attaching means, such as a tongue and groove, or snap lock, can be subsequently tooled in to the oriented material to create a product that can be attached in series in a commercial application, such as flooring of furniture manufacturing. Surface treatment can also be applied to the billet for increasing the surface properties of the billet, such as adding a protective coating, such as polyurethane, to protect the surface layer from scratching.

By varying parameters of the ram extrusion process, such as temperature, pressure and die contours, properties of composite material 24 can be changed. The properties of composite material 24 can also be changed by varying amounts of filler 12, and by changing the composition of filler 12. This will affect the physical properties of composite material 24, such as colour, texture, electrical conductivity, glow in the dark and fire retardancy.

The oriented product 48 of composite material 24 can be manipulated in order to meet a manufacturer's specifications with regards to the final commercial application. Oriented product 48 can be cut and shaped during the ram extruding process. In the presently preferred embodiment, composite material 24 is extruded as oriented product 48 of varying specifications, however it can also be extruded as a sheet for use in commercial applications such as indoor and outdoor furniture manufacturing.

The present invention provides a new composite material, and a method and apparatus for extruding the composite material. The invention includes the initial mixing of a binding agent and a filler to produce a feedstock which is subsequently extruded as a billet of a composite material. The composite material is stronger and more durable then the starting materials. The composite material also contains striations of the filler which allows the manufacturer to produce a composite material that can reflect the image of a natural product and can be used in commercial applications such as floor coverings. The properties of the composite material can also be changed, in order to meet the requirements for the commercial application of the product, by the incorporation of different types of filler and by varying the amount of filler used.

Figure 4:
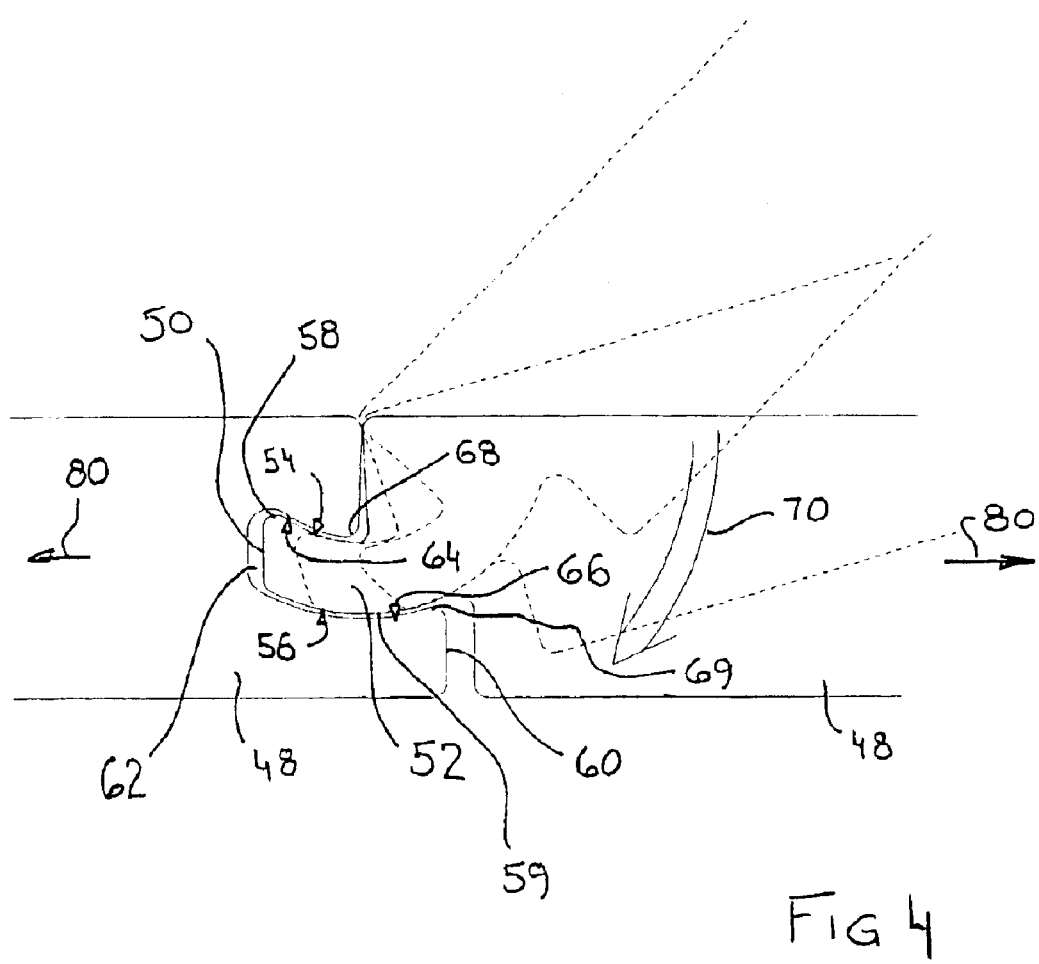
FIG. 4 is an end elevation of a tongue and groove joint which may be formed in the extrusion method of the present invention.

FIG. 4 is an end elevation showing a particularly advantageous tongue and groove configuration which can be formed along opposite edges of the oriented product 48 of the composite material 24. A first edge 50 has a tongue 52 formed thereon having an upper concave face 54 and a lower convex face 56. The opposite edge 60 has a groove 62 with an upper convex edge 64 and a lower concave edge 66. The tongue 52 and the groove 62 register to allow the tongue to be initially inserted into the groove 62 of an adjacent strip of oriented product 48 at a relative angle on the order of 45° between the adjacent strips of oriented product 48 and then rotated into place in the direction of arrow 70 so that the tongue 52 nests in the groove 62 with the adjacent strips of oriented product in a parallel side by side configuration.

Once the tongue 52 and the groove 62 are nested, removal in a lateral direction indicated by arrows 80 is prevented first by interference between an upper edge 58 of the tongue and a depending edge 68 of the groove. Lateral separation is further inhibited by an upwardly extending edge 69 of the groove 62 interfering with a lowermost portion 59 of the tongue 52.

Extrusion rates for the composite material 24 will vary depending on various factors such as the particular composite material 24 selected, the degree of reduction, and the cross-sectional area of the extruded strip or column. Extrusion rates are however rather slow and rates on the order of six inches per minute (6 in./min.) are not atypical.

It has been found that rater than extruding the composite material 24, by pressing it through the die 38, the composite material may be drawn through the die 38. FIG. 5 illustrates such a drawing process.

One manner of drawing the composite material through the die 38 is to initially commence by extrusion, as discussed above. Once an end 100 of the oriented product 48 begins to emerge from the die 38, the end may be grasped, such as by a clamp 102 and pulled. The pulling would typically be done with no further pressing force being applied and yields an oriented end product 104.

In tests, pulling rates of up to 14 ft./min. (fourteen feet per minute) have been achieved which was limited by machine capacity. It is expected that pulling rates of 20 ft./min. (twenty feet per minute) are entirely feasible.

The properties of the oriented end product 104 produced by drawing are significantly different than those produced by extrusion. By way of example, a starting billet 110 was first formed by combining a wood fiber plastic concentrate containing 60% wood particles of about 60 mesh size and 50% polypropylene with virgin polypropylene in a 1:1 ratio. This yielded a composition having about 30% wood fiber and 70% polypropylene. The resulting combination was heated and extruded to form the billet 110.

The billet 110 was of rectangular cross-section measuring about two inches by two inches (2"×2"). The billet 110 was heated in an oven to about 150° C. (ie. close to but below the melting point of polypropylene which is about 160° C.) and transferred to the pressure chamber 30 and initially forced through the die 38. The extruded material was then grasped using the clamp 102 and drawn at a rate of about 4 ft./min. (Four feet per minute) and once it had been entirely drawn through the die 38, allowed to cool into the oriented end product 104. The draw ratio (i.e. the initial cross-sectional area divided by the final cross-sectional area) was 10:4.

The oriented end product 104 bore a remarkable similarity both in look and in feel to wood. The oriented end product 104 diminished in density by about half compared to the starting billet 110. The density of the oriented end product 104 was about 0.59 g/cc (grams per cubic centimeter) compared to a density of about 1 g/cc for the starting billet 110.

The oriented end product 104 could be shaped as if it were wood and in planing and sawing behaved very much like wood producing shavings remarkably like wood shavings and sawdust remarkably like wood sawdust. The oriented end product 104 received both nails and screws without splitting much like wood.

In testing, the oriented end product was found to have a density and flexural strength not unlike wood and a modulus of elasticity of about half that of wood. Typical properties were a density of 0.059 g/cc, flexural strength of 6,353 lb/in$^2$ and a modulus of elasticity of 799,298 lb/in$^2$. Unlike wood however the oriented product 104 was virtually non adsorptive to water.

Although testing was carried out using a starting billet 110, the process can no doubt be automated as schematically illustrated in FIG. 6. FIG. 6 shows an extruder 120 in which feed materials 121 may be blended and extruded through a die 122 into a first column 124. The first column 124 is fed through a first haul off 125 into a continuous furnace 126 where its temperature is adjusted to a drawing temperature. The first haul off 125 acts against the extrusion direction to maintain extrusion pressure and to support the column 124. The temperature adjusted first column 124 is fed into a drawing die 128 at the exit of which it is reduced in size to a second column 130. The second column 130 is grasped by a suitable haul off 132 such as sold under the trademark CATERPILLAR as it exits the drawing die 128. The haul off 132 then pulls the second column 130 at a desired rate to form an oriented product 138.

The above-described embodiments of the invention are intended to be examples of the present invention and alterations and modifications may be effected thereto, by those of skill in the art, without departing from the scope of the invention which is defined solely by the claims appended hereto.

We claim:

1. A process for producing an oriented composite material, said process comprising the steps of:
   i) combining an extrudable polymer with a cellulose based particulate filler to form a starting material;
   ii) heating and extruding said starting material into a first column;
   iii) adjusting the temperature of said first column to a drawing temperature;
   iv) presenting said first column to a drawing die and causing said first column to exit said drawing die in a second column having a cross-sectional area less than that of said first column;
   v) applying a pulling force to said second column to draw said first column through said drawing die at a rate sufficient to cause orientation of said polymer and to cause said second column to diminish in density to form said composite material.

2. A process according to claim 1 wherein:
   said extrudable polymer is selected from the group consisting of polypropylene, polyethylene and polyvinyl chloride.

3. A process according to claim 1 wherein:
   said extrudable polymer is a plastic; and
   said particulate filler is selected from the group consisting of wood, hemp, flax, straw and wheat.

4. A process according to claim 2 wherein:
   said extrudable polymer is present in an amount of from 95 to 60 percent by weight in said starting material.

5. A process according to claim 4 wherein:
   said particulate filler is selected from the group consisting of wood, hemp, flax, straw and wheat.

6. A process according to claim 5 wherein:
   said extrudable polymer is polypropylene; and
   said particulate filler is wood sawdust.

7. A process according to claim 5 wherein:
   said wood sawdust has a particle size of about 60 mesh.

8. A process according to claim 7 wherein:
   said wood sawdust in present in an amount of from about 20% to 30% by weight in said starting material.

9. A process according to claim 1 wherein;
   said second drawing die has a drawn ratio of from 4 to 20.

10. A process according to claim 1 wherein;
    said rate of drawing through said drawing die is sufficient to cause said composite material to have a density of from 0.5 to 0.9 of the density of said starting material.

* * * * *